United States Patent [19]
Barnes

[11] Patent Number: 4,783,574
[45] Date of Patent: Nov. 8, 1988

[54] PROCESS FOR HYDROCARBON CONVERSION

[75] Inventor: Peter H. Barnes, HR The Hague, Netherlands

[73] Assignee: Shell Oil Company, Houston, Tex.

[21] Appl. No.: 112,980

[22] Filed: Oct. 27, 1987

[30] Foreign Application Priority Data

Dec. 2, 1986 [GB] United Kingdom ............... 8628839

[51] Int. Cl.$^4$ ............................................. C07C 5/13
[52] U.S. Cl. ............................... 585/738; 585/826
[58] Field of Search ........................... 585/738, 826

[56] References Cited

U.S. PATENT DOCUMENTS

| | | | |
|---|---|---|---|
| 2,935,467 | 5/1960 | Fleck et al. | 585/826 |
| 3,020,322 | 2/1962 | Allen | 585/738 |
| 3,150,205 | 9/1964 | Krane et al. | 585/738 |
| 3,160,581 | 12/1964 | Mattox et al. | 585/826 |
| 3,227,647 | 1/1966 | Krane | 585/738 |
| 4,709,117 | 11/1987 | Gray | 585/738 |

Primary Examiner—Curtis R. Davis
Attorney, Agent, or Firm—Kimbley L. Muller

[57] ABSTRACT

A process is disclosed for catalytic conversion of hydrocarbons (e.g. hydroisomerization of unbranched paraffins) by passing a hydrocarbon-containing feed stream at hydrocarbon conversion conditions sequentially in opposite directions through at least part of a zone containing hydrocarbon conversion catalyst and subsequently through at least part of a zone containing adsorbent material capable of adsorbing unconverted hydrocarbons and sequentially passing a sweep fluid in the same direction as said feed stream through at least part of said zone containing absorbent material.

4 Claims, 1 Drawing Sheet

PROCESS FOR HYDROCARBON CONVERSION

The invention relates to a process for hydrocarbon conversion.

It is known to convert hydrocarbons which are present in various oil fractions (e.g. hydrocarbon oil distillates) by contacting them in the presence of reactant- and/or inert gas with a catalyst possessing activity for converting said hydrocarbons into desired products at conversion conditions in one or more conversion zones.

Furthermore, it is known to separate unconverted hydrocarbons from desired products by contacting effluent from a hydrocarbon conversion zone in an adsorption zone with adsorbent material (e.g. molecular sieve particles) capable of adsorbing unconverted hydrocarbons, thus obtaining a product stream containing the desired products and other non-adsorbed fluids, if any. The adsorbed unconverted hydrocarbons are periodically desorbed from the adsorbent material by passing desorption fluid through the adsorption zone.

It is also known to couple said conversion- and separation processes and to recycle unconverted hydrocarbons obtained from the separation step to the conversion step in order to attain substantially complete conversion of the hydrocarbon-containing feed into desired products.

However, a major disadvantage of the processes described hereinbefore is that a plurality of pressure vessels (typically one conversion reactor and four vessels for adsorption-, purge-, desorption- and flushing-steps) is required therefor. Moreover, a substantial amount of pressure valves and process control instrumentation is required to switch streams at appropriate intervals to the various process zones contained in the pressure vessels, even when all process zones are located in a limited number of vessels.

Surprisingly, it has now been found that a multi-step process for the conversion of hydrocarbons can be carried out sequentially in zones containing catalyst and adsorbent material by reversing the direction of the fluids flow in said zone only twice during a full process cycle.

The invention therefore relates to a process for catalytic conversion of hydrocarbons which comprises passing a hydrocarboncontaining feed stream at hydrocarbon conversion conditions sequentially in opposite directions through at least part of a zone containing hydrocarbon conversion catalyst and subsequently through at least part of a zone containing adsorbent material capable of adsorbing unconverted hydrocarbons and sequentially passing a sweep fluid in the same direction as said feed stream through at least part of said zone containing adsorbent material.

A wide variety of hydrocarbon-containing feed streams can be treated by means of the present process, such as paraffinic- and olefinic aliphatic compounds and aromatic compounds.

The process according to the present invention is preferably carried out in a single pressure vessel and is especially suited for the isomerization of unbranched hydrocarbons in the presence of a hydrogencontaining sweep fluid.

The sweep fluid is preferably used to change the direction of flow of the hydrocarbon-containing feed stream by passing the sweep fluid through said zones simultaneously with the feed stream in a similar direction and sequentially reversing the flow direction of the sweep fluid. However, it is not necessary to introduce the feed stream and the sweep fluid into the same part of the catalyst- or adsorbent zone. Preferably, the sweep fluid is alternatingly introduced into the upperand lower parts, respectively, of a combined zone, whereas the feed stream is preferably (simultaneously or alternatingly) introduced at one or more points in the central part of said combined zone.

The combined zone referred to hereinbefore preferably contains at least two outer adsorbent beds and at least one central catalyst bed arranged in stacked bed configurations; most preferably said zone contains two adsorbent beds and one central catalyst bed in a single pressure vessel, thus attaining substantial savings compared with the number of pressure vessels required for known hydrocarbon conversion/separation processes.

The feed stream is preferably sequentially introduced at opposite ends of the central catalyst bed in order to make optimum use of the entire catalyst mass contained in said bed during each step of the process sequence. Alternatively, the feed stream may be introduced into the central part of the combined conversion/adsorption zone between two catalyst beds arranged in said part. Although switching means (e.g. a multi-port valve), which are normally required in the former case for directing the feed stream to the appropriate end of the central catalyst bed, do not have to be used in the latter case for the feed stream, the latter set-up is considered less attractive since only part of the catalyst mass is contacted with the feed stream during each step of the process sequence.

The two or more adsorbent beds which are preferably arranged near the ends of the conversion/adsorption zone, are preferably alternatingly adsorbing and desorbing hydrocarbons during subsequent steps of the process according to the invention; while at least one bed containing adsorbent material adsorbs unconverted hydrocarbons at the downstream end of said zone (with respect to the flow direction of the sweep fluid), at least one other bed located at the upstream end of said zone preferably desorbs unconverted hydrocarbons which will subsequently at least partly be converted in one or more centrally arranged catalyst beds.

The unbranched hydrocarbons which are suitably isomerized with the process according to the invention, preferably contain paraffins having from 4–10 carbon atoms per molecule, and in particular 5 or 6 carbon atoms per molecule i.e. (un)branched pentane and/or hexane, which are usually present in so-called tops or light naphtha fractions derived from a crude oil, in mixtures of paraffinic hydrocarbons isolated from reformed naphtha (platformate) and in light paraffin fractions obtained from Fischer-Tropsch synthesis products. The feed stream may furthermore contain (un)saturated cyclic hydrocarbons (e.g. cyclopentane, methylcyclopentane and/or benzene) in quantities up to 30% by volume without having a substantial negative effect on the process according to the invention.

The hydrogen-containing sweep gas which is used in a preferred embodiment of the present process need not be completely pure and may contain up to 30 mol %, and preferably not more than 20 mol %, of other compounds such as $CO$, $CO_2$, $N_2$, argon and/or hydrocarbons, e.g. reformer off-gas, provided that these compounds are substantially inert with respect to the feed and the hydroconversion (isomerization) catalyst at the conversion conditions applied.

The process according to the invention may be carried out within a relatively wide range of operating conditions, provided that the catalyst, feed, product and the equipment applied can withstand said conditions. Suitably the present process is carried out at a temperature from 100°–500° C., a total pressure from 1–200 bar abs., an overall space velocity from 0.1–10 kg hydrocarbons-containing feed/1 catalyst/hour and an overall pure hydrogen/feed molar ratio from 0.1–10. Preferred process conditions include a temperature from 200°–400° C., and a total pressure from 3–100 bar abs.

Particularly preferred conditions for isomerization of unbranched paraffins are a temperature from 240°–290° C., a total pressure from 5–50 bar abs., an overall space velocity from 0.5–2 kg hydrocarbon feed/1 catalyst/hour and an overall pure hydrogen/feed molar ratio from 1–5. The overall space velocity is defined as the total weight of hydrocarbons process per hour divided by the total volume of catalyst in all isomerization zones. The overall hydrogen/feed molar ratio is defined as the total number of moles $H_2$ introduced into the process over the total number of moles of hydrocarbon feed, both per unit of time.

As catalyst suitably a heterogeneous hydrocarbon conversion catalyst is applied containing one or more metals from Groups 1b, 2a, 2b, 3a, 4a, 4b, 5b, 6b, 7b or 8 of the Periodic Table of the Elements on a carrier material. Reference is made to the Periodic Table as published in the Handbook of Chemistry and Physics, 55th editioin (1975), CRC Press, Ohio, U.S.A.

The isomerization catalysts employed in the isomerization zones are suitably specific heterogeneous hydroisomerization catalysts having an acid activity and a hydrogenation activity and comprising one or more metals from Group 8 of the Periodic Table of the Elements on a carrier material. The carrier material has acidic properties and may suitably consist of silica-alumina, in particular zeolites (e.g. mordenite, faujasite or Y-sieve) in the hydrogen form or exchanged with rare earth ion, or of alumina rendered acidic by combination with halogen (e.g. chlorine). Preferably, the employed catalysts comprise at least one noble metal from Group 8 (in particular platinum) on H-mordenite as carrier material. Most preferably, the H-mordenite is prepared by treating mordenite one or more times with an aqueous solution of an acid (e.g. hydrochloric acid) and, separately, one or more times with an aqueous solution of an ammonium compound (e.g. ammonium nitrate), followed by drying (e.g. at 100°–200° C.) and calcining (e.g. at 400°–700° C.) of the treated mordenite.

The metal(s) (preferably noble metals) may be incorporated into the carrier material by any method known in the art, such as impregnation, precipitation or, preferably, ion exchange. If desired, the carrier material can be mixed with an inert binder before or after incorporation of catalytically active metal(s). Alternatively, the metal(s) may be incorporated into the binder before mixing with the carrier material. Suitable binders are e.g. natural clays (such as kaolin or bentonite) and refractory oxides such as alumina, silica, boria, chromia and zironia or combinations thereof.

The isomerization catalyst particles may have any suitable form, such as tablets, spheres, granules or cylinders. The particles suitably have a diameter from 0.1–10 mm, and preferably from 0.5–5 mm.

The adsorbent material which should be capable of adsorbing unconverted hydrocarbons to be suitable for application in the present process, preferably contains molecular sieve material. When unbranched hydrocarbons are to be isomerized with the present process, the molecular sieves applied must be selective with respect to the degree of branching of the hydrocarbons applied i.e. unbranched hydrocarbons should be substantially adsorbed, whereas (in order to attain good separation) branched hydrocarbons should not be retained in any substantial amount in the molecular sieve-containing adsorbent beds. Said selectivity is dependent to a large extent on the pore diameters of the molecular sieve, which diameters are preferably in the range from 0.3–0.8 nm, and most preferably from 0.4–0.6 nm. Suitably, synthetic or natural zeolites, erionite and offretite are used as molecular sieve, and preferably zeolite 5A. The particles which comprise molecular sieve material may in addition comprise a binder material such as alumina, silica or silica-alumina, in order to improve the crushing strength of the particles; said particles may also be mixed with particles which do not contain molecular sieve material (e.g. catalyst particles).

The adsorbent particles may have any form which is suitable for use in adsorbent beds, such as tablets, spheres, granules, cylinders and two-, three- or multi-lobed particles. Particles which can pass openings with a diameter from 0.05 to 10 mm, and preferably from 0.1 to 5 mm, are suitably used in the process according to the invention.

Before being employed in the process according to the invention, the particulate molecular sieve is suitably at least partly dehydrated by heating at a temperature from 100°–600° C., depending on the type of material used. In some cases it is preferred to carry out the heating in situ in the conversion/adsorption zone in order to avoid contact of the molecular sieve material with moist air.

The invention also relates to catalytically converted hydrocarbons whenever prepared according to a process as described hereinbefore.

The invention further relates to an apparatus which is suitable for carrying out the process as described hereinbefore, which apparatus comprises a housing having one or more feed inlet means arranged in its central section and at least two sweep fluid supply/product withdrawal means arranged in opposite sections of the housing which housing further contains catalyst bed supporting means and a plurality of adsorbent bed supporting means.

Preferably, the apparatus according to the invention further comprises at least one multi-port switch valve which is in communication with the sweep fluid supply/product withdrawal means, and optionally another multi-port switch valve which is in communication with at least two feed inlet means arranged below and above central catalyst bed supporting means.

BRIEF DESCRIPTION OF THE INVENTION

DETAILED DESCRIPTION OF THE INVENTION

The invention is schematically illustrated with the use of the Figures wherein a specific embodiment is depicted to which the present invention is by no means limited.

Figure 1:
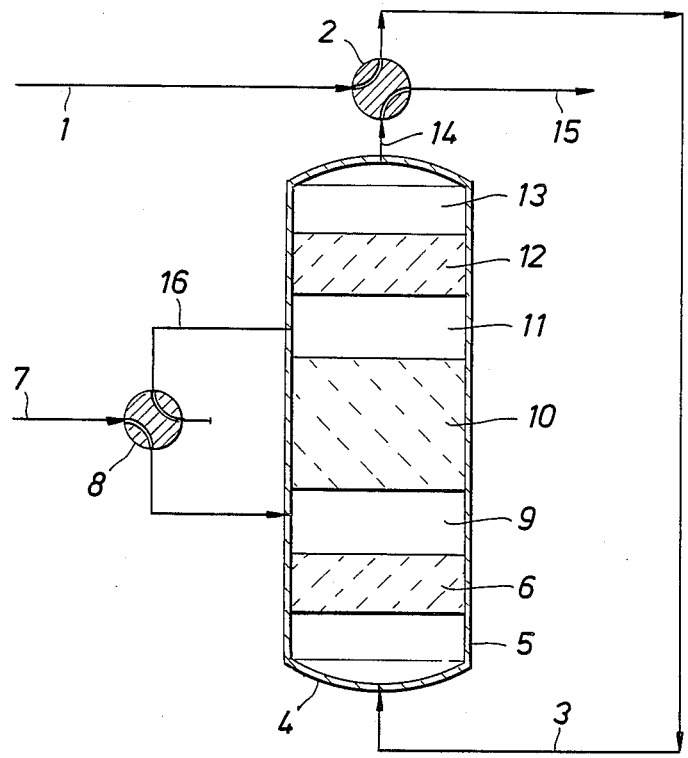
FIG. 1 is a schematical flow pattern of one embodiment of this invention.
Figure 2:
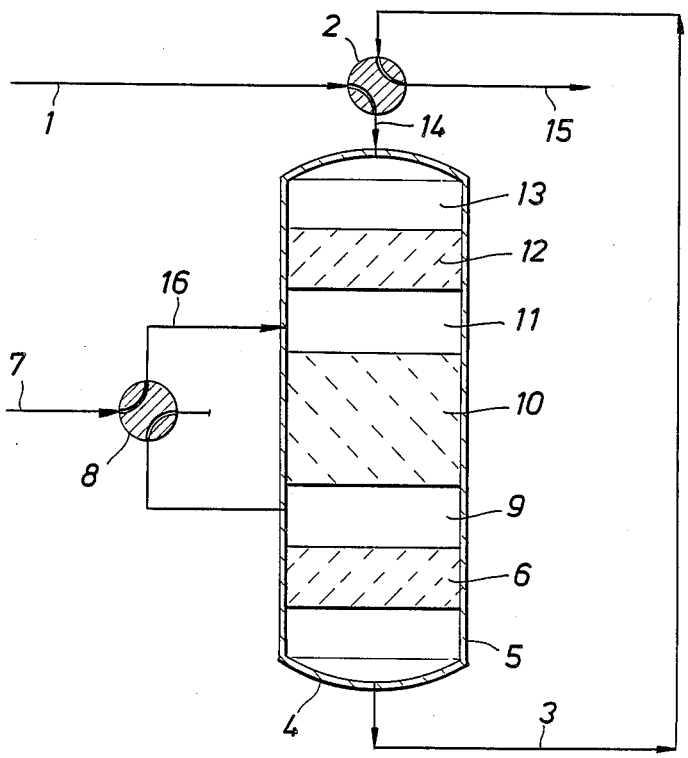
FIG. 2 is a schematic flow pattern of a second embodiment of this invention.

The process according to the invention is described herein as a two step process which steps are depicted in FIGS. 1 and 2, respectively, schematically representing the apparatus in which the process can be carred out; the same reference numerals are used for both Figures.

In FIG. 1, hydrogen-containing sweep gas is directed via line (1), 4-port switch valve (2) and line (3) to the bottom part (4) of the single pressure vessel (5) employed in the set-up as depicted. Unbranched hydrocarbons present in lower adsorbent bed (6) after the previous process step are desorbed from said bed by means of the upwardly flowing sweep gas which entrains the desorbed unbranched hydrocarbons and the hydrocarbonscontaining feed gas introduced via line (7) and 4-port switch valve (8) into space (9) below the single catalyst bed (10).

Alternatively, feed gas can be introduced directly via line 7 (without the use of a 4-port switch valve) into a space between two catalyst beds which can replace catalyst bed (10) in an embodiment which is not represented by the Figures.

The upwardly flowing combined gas stream is partly converted in catalyst bed (10) into desired product(s) and subsequently passes through space (11) into upper adsorbent bed (12) wherein unconverted hydrocarbons are adsorbed. The converted hydrocarbon product is subsequently removed from space (13) via line (14), switch valve (2) and line (15).

In FIG. 2 the second process step is depicted during which the process is carried out in opposite direction by turning switch valves (2) and (8) by 90 degrees. Sweep gas now moves via line (1), switch valve (2) and line (14) downwardly through sapce (13) into adsorbent bed (12) which contains adsorbed unconverted hydrocarbons from the first process step. As a result, said hydrocarbons are desorbed from bed (12) and carried together with the sweep gas and hydrocarbon feed (introduced via line (7), switch valve (8) and line (16) into space (11)) downwardly into catalyst bed (10) wherein conversion of hydrocarbons is continuously carried out during both process steps, thus ensuring optimal use of the catalyst. The product stream obtained from the bottom part of catalyst bed (10) is led via space (9) to adsorbent bed (6) wherein unconverted hydrocarbons are removed from the product stream, thus providing the desired product which is removed via line (3), switch valve (2) and line (15).

Further separation of the products obtained via line (15) in both process steps is suitably carried out (in equipment which is not shown in the Figures) in order to separate hydrogen-containing gas from said products which gas can be recycled (e.g. by means of a compressor) to line (1) (and optionally combined with fresh hydrogen-containing as to be re-used as sweep gas).

I claim as my invention:

1. A process for the catalytic conversion of a hydrocarbon feed stream, at hydrocarbon conversion conditions, in a reactor-separation sequence comprising at least two outer adsorbent beds and at least one central catalyst bed containing a hydrocarbon conversion catalyst, said adsorbent and catalyst beds being arranged in stacked configuration, wherein said central catalyst bed has two feed stream inlets which operate only one at a time wherein said inlets are situated in an upper part and a lower part of said catalyst bed, said process comprising the steps of:

a. passing said hydrocarbon feed stream through said feed inlet in said lower part of said catalyst bed and through at least part of said catalyst bed to form a first isomerization zone effluent stream comprising converted and unconverted hydrocarbons;

b. passing said first isomerization zone effluent stream through a first adsorption zone containing an adsorbent capable of adsorbing said unconverted hydrocarbons in said first isomerization zone effluent stream, said first adsorption zone being situated next to said catalyst bed and proceeding with this pasage step for a period of time sufficient to permit said adsorption of said unconverted hydrocarbons in said adsorption zone;

c. sequentially passing a sweep fluid through at least a portion of said catalyst bed and said first adsorption zone in the same direction of flow as said hydrocarbon feed stream passage of step (a) and said first isomerization zone effluent stream passage of step (b) for a period of time sufficient to desorb and recover said adsorbed unconverted hydrocarbons;

d. recycling for conversion said desorbed and recovered unconverted hydrocarbons derived from step (c) to said catalyst bed through either said feed inlet in said upper part or said lower part of said catalyst bed;

e. passing, at a time after cessation of passage of said hydrocarbon feed stream to said feed inlet in said lower part of said catalyst bed, said hydrocarbon feed stream through said feed inlet in said upper part of said catalyst bed and passing said hydrocarbon feed stream through at least part of said catalyst bed to form a second isomerization zone effluent stream comprising converted and unconverted hydrocarbons;

f. passing said second isomerization zone effluent stream of step (e) through a second adsorption zone containing an adsorbent capable of adsorbing said unconverted hydrocarbons in said second isomerization zone effluent stream, said second adsorption zone being situated next to said catalyst bed and proceeding with this passage step for a period of time sufficient to permit said adsorption of said unconverted hydrocarbons in said second adsorption zone;

g. sequentially passing a sweep fluid through at least a portion of said catalyst bed and said second adsorption zone in the same direction of flow as said hydrocarbon feed stream passage of step (e) and passage of said second isomerization zone effluent stream of step (f) for a period of time sufficient to desorb and recover said adsorbed unconverted hydrocarbons;

h. recycling for conversion said desorbed and recovered unconverted hydrocarbons derived from step (g) to said catalyst bed through either said feed inlet in said upper or said lower part of said catalyst bed; and i. continuing with said process sequence of steps (a) through (d) while not performing steps (e) through (h) and continuing with said process sequence of steps (e) through (d) while not performing steps (a) through (h).

2. The process according to claim 1 wherein said hydrocarbon conversion conditions include a temperature from 100°–500° C., and at a pressure from 1–200 bar abs.

3. The process according to claim 1 wherein said hydrocarbon conversion conditions include a temperature of from 200°–400° C. and a pressure of 5–50 bar abs.

4. The process according to claim 1 wherein a said hydrocarbon conversion catalyst is heterogeneous and comprises one or more metals from Groups 1b, 2a, 2b, 3a, 4a, 4b, 5b, 6b, 7b or 8 of the Periodic Table of the Elements on a carrier material.

* * * * *